United States Patent

[11] 3,587,675

| [72] | Inventor | Daniel A. Di Tucci<br>126 Cregar St., Oceanside, Calif. 92054 |
|---|---|---|
| [21] | Appl. No. | 769,830 |
| [22] | Filed | Oct. 23, 1968 |
| [45] | Patented | June 28, 1971 |

[54] FLOWER POT FILLING MACHINE
4 Claims, 5 Drawing Figs.

[52] U.S. Cl. .................................................. 141/125,
141/131, 141/237, 222/318
[51] Int. Cl. ..................................................... B65b 1/04,
B65b 1/30, B65b 43/42
[50] Field of Search........................................... 141/131–
134, 115, 125, 173, 174, 237, 324, 234,
(Inquired); 222/318, 369, 371

[56] References Cited
UNITED STATES PATENTS
2,693,306 11/1954 Sidebotham................. 141/131

| 2,721,684 | 10/1955 | Heinl et al. ............... | 141/174 |
| 2,728,510 | 12/1955 | Dunnican et al............ | 141/125 |
| 2,785,706 | 3/1957 | Ryan et al.................. | 141/131 |

*Primary Examiner*—Carlton R. Croyle
*Assistant Examiner*—John J. Vrablik
*Attorney*—Herbert C. Schulze

ABSTRACT: This is a machine for filling flower pots and the like with properly mixed dirt for use by nurseries and others using large quantities of flower pots, flats, and the like. In this machine the flower pots are carried by conveyor under a continuously feeding hopper. Brush means are utilized to level the filled pots to the proper depth. Excess dirt is automatically fed back into the supply hopper and returned in the continuous filling operation.

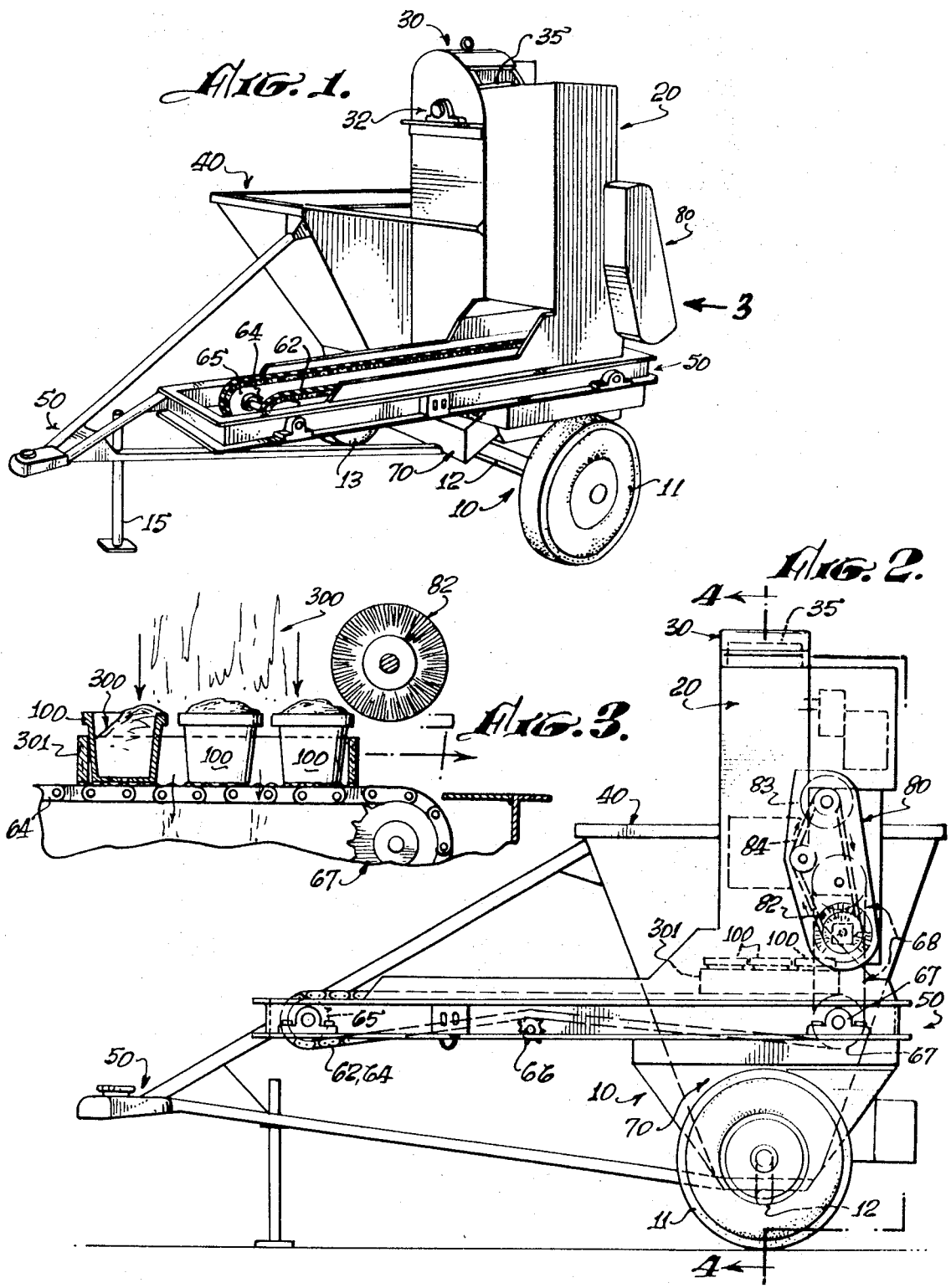

PATENTED JUN 28 1971

INVENTOR.
DANIEL A. DiTUCCI,

By

Herbert C. Schulze
ATTORNEY.

FLOWER POT FILLING MACHINE

BACKGROUND OF THE INVENTION

1. Field of the Invention

This is in the general field of filling machines and is particularly directed to filling machines for filling dirt and other compositions of matter into flower pots and the like.

2. Description of the Prior Art

The prior art in this field as known to me is almost completely limited to hand filling of pots with the appropriate material. I do know that there have been some attempts to make machines for this purpose, but in each such case such machines contemplates volume dumping of material upon pots either stationary or moving in which excess material accumulates outside of the machine and in which there is no proper control of the amount of material to be fed into each pot and, in particular, no proper control of the depth below the rim of the pot to which the material is filled. Likewise in any equipment with which I am familiar there has not been a continuous feed and recirculation of the material which has become excess to the use of the pots as being filled.

SUMMARY

In the nursery business it is common to use large quantities of pots in which small plants, or seeds, are planted and likewise to use large quantities of shallow boxes commonly called "flats" for similar purposes.

In the past it has generally been the practice to fill such pots and the like by hand with properly mixed compositions of earth, fertilizer and other materials. This is a costly procedure in which it will normally take nine persons approximately 16 hours to fill approximately 5,760 pots of an average size. With my machine it has been found that three persons will fill 5,760 pots in 1 hour with one machine of this invention.

Further than this it has been found that it is quite desirable to have a carefully controlled level of filling in the pots depending upon the use to which they are going to be put. For example, sometimes it is desired to have the pot originally filled even with the upper rim of the pot. In other cases it is desirable to fill 1 inch and 1½ inch, or the like, below the rim depending upon the exact use to which the pot will be put and the requirements of the particular uses. This is a very difficult matter to control, even by hand, and I have devised a system using a rotary brush in which the depth of fill can be accurately controlled.

It is also found in the past, whether by attempted machine filling or by hand, that great quantities of the mixed materials may be lost be being scattered about during the filling operation. It has thus been deemed desirable, and I have so provided in this invention, that the material is not lost; I have provided a new and unique method of recirculating the used material and mixing it with additional new material so that there is a constant quality control.

It is an object of this invention to provide a mechanized means for filling flower pots and the like with appropriate materials;

It is a further object of this invention to provide such a means for filling flower pots and the like in which the depth of fill of the material can be controlled in the pots;

It is a further object of this invention to provide a means for filling flower pots and the like in which excess material is returned to the basic material supply by automatic means.

The foregoing and other objects and advantages of this invention will be clear to those skilled in the art upon reading the following specification in conjunction with the attached drawings.

BRIEF DESCRIPTION OF THE DRAWINGS

FIG. 1 is a perspective of a preferred embodiment of this invention;

FIG. 2 is a side elevation of the same embodiment shown in FIG. 1 with certain elements shown in phantom;

FIG. 3 is an enlarged partially sectioned and partially broken away view of the area 3 on FIG. 1;

DESCRIPTION OF A PREFERRED EMBODIMENT

Figure 4:
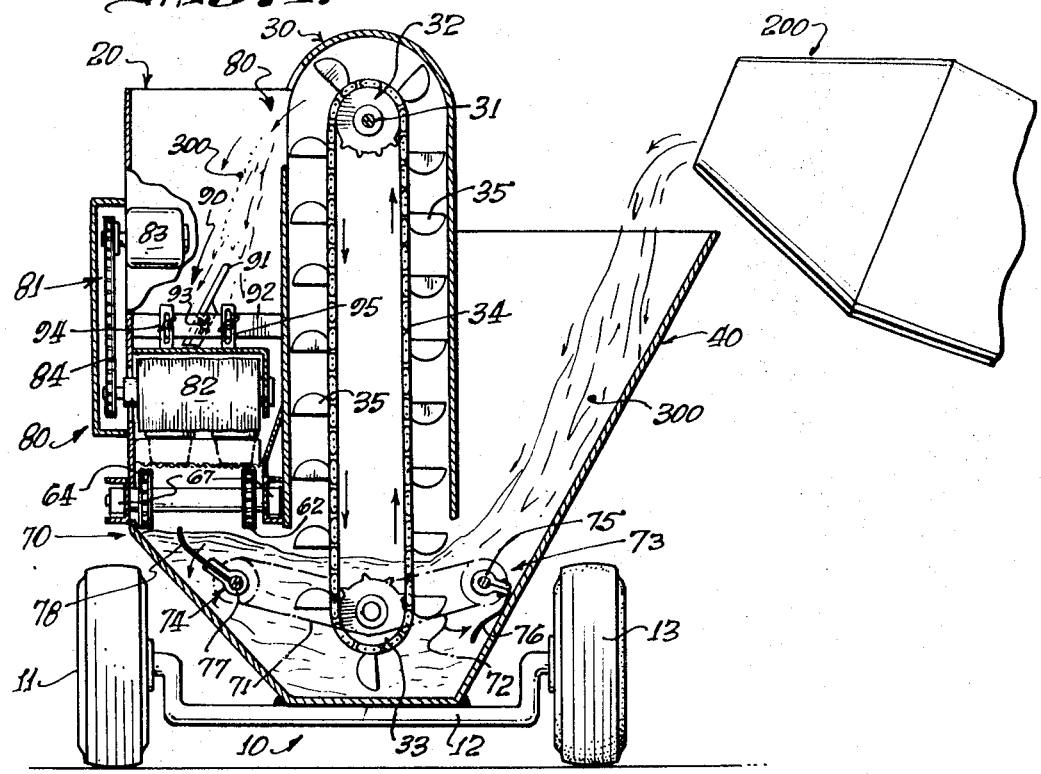
FIG. 4 is a section through 4—4 on FIG. 2.

It will be observed that this machine has been mounted upon a trailerlike arrangement for easy portability within the nursery or other area where the same is used.

The basic trailer type arrangement is readily understood and is illustrated generally by the numeral 10 and comprises a frame 50 attached to axle 12 and having two wheels 11 and 13. A leg 15 has been provided to be used when the trailer is disengaged from the towing vehicle.

The unit is comprised of a hopper 40, feeding elevator 30, material dumping chute 20, pot conveyor 60, excess material chute 70, and brush mechanism 80.

The general operation of the machine and the various elements are best seen in FIG. 4.

In the operation of this machine the material for filling pots is mixed in a cement mixer of customary design or other mixer 200, and is dumped from the mixer into the hopper 40 as indicated. The material is indicated generally by the numeral 300. The material travels down the hopper 40 and is picked up by the buckets 35 on the bucket elevator of customary design, carried by chain or the like 34 and travelling on sprockets 32 and 33 suitably mounted on shafts in customary manner as indicated at 31 for example.

It will be observed that the buckets travel within an enclosed area for neatness and to avoid excess spilling of the material or excess picking up of the material by wind.

It will be observed that the excess material from the filling of the pots, as will be described hereafter, falls down into the overflow hopper 70 which interconnects with the basic hopper so that any excess material is dropped back into the hopper rather than being dropped on the ground.

A pair of agitators 74 and 75 are shown within the hopper areas. Each agitator comprises a clamp 75 and 77 respectively with a length of belting or the like 76 and 78 respectively. These agitators are driven by chains or belts 71 and 72 (shown in phantom only) from the elevator drive shaft as indicated by the phantom lines. By using these agitators the feed material continually drops into the area where it is picked up by the buckets and thus there is no dead space which might otherwise occur.

A conveyor for the pots to be filled is mounted within the frame 50 as indicated. The conveyor comprises two shafts with a pair of sprockets upon each shaft and a chain or the like 62 and 64 respectively running between each set of sprockets. The pots are placed in a container 301 which is a wooden frame, rectangular in shape, having a screen bottom 302 through which the excess material may flow freely into the hopper 70. The screen 302 should be course enough that the material will flow through readily. This is a mere matter of choice by the operator, but can be in the nature of 2-inch squares in the screening.

A series of flower pots 100 are placed within the frame 301 and on the screen 302; this is then placed upon the conveyor at the front end of the trailer arrangement. The feeding mechanism is running constantly and if there are no pots present the material 300 merely drops back to hopper 70. However, when pots are passing under it, the pots will be filled as indicated by FIG. 3. Thus I have provided a rotating brush 82 driven by mechanism 81 and specifically by chain 84. A guard 80 encloses this mechanism so that there will be no danger to operators. This mechanism is driven by motor 83.

Figure 5:
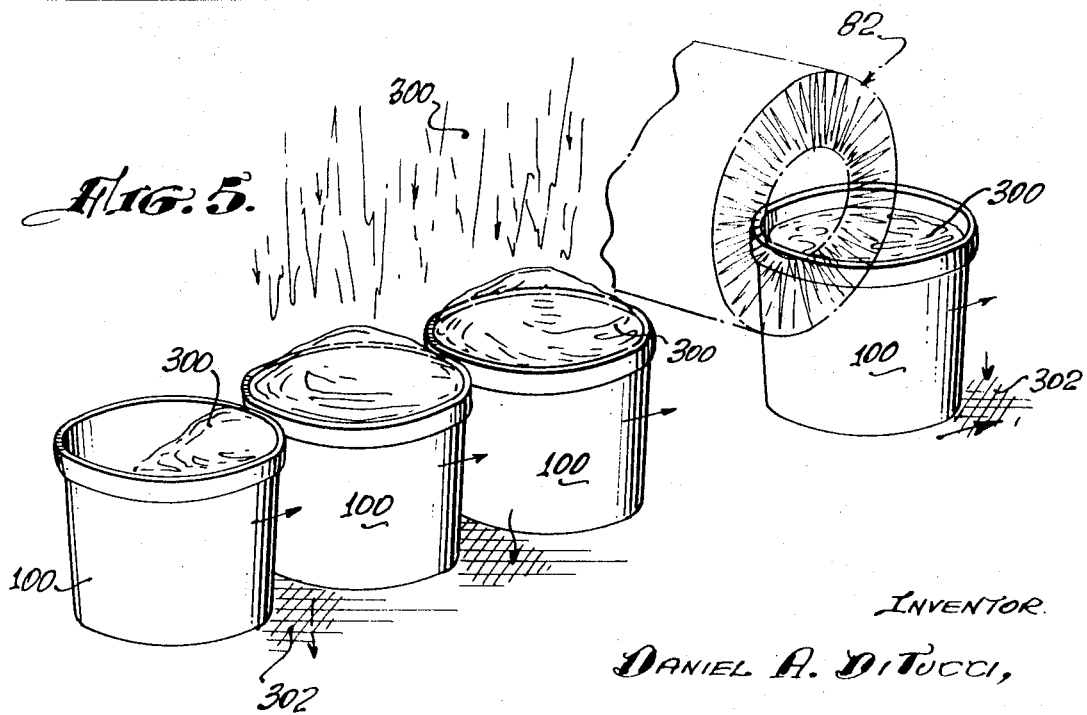
FIG. 5 is an enlarged view of a portion of the machine shown in FIG. 3 to illustrate the brush action, the brush being shown in phantom lines.

FIG. 5 shows the result of the operation of the brush, which normally operates in a direction such that its surface in contact with the material is traveling in the opposite direction from the direction of travel of the pots. After the brush passes over an overfilled pot the pot will be filled to the proper extent as indicated in the FIG. 5 wherein one pot is shown to have passed through the brush and is now uniformly filled to a distance to about one-half inch below the upper edge of the pot.

A guard arrangement 20 to enclose the back side and, also, to provide the chute through which the material flows through to the pots has been provided on its interior with a baffle plate 91 mounted as shown on a bracket 92 adjustable through lock screws 94 and lock screw 93 so that the amount of material flowing to each side of the baffle may be controlled in order to give uniform filling on two rows of pots traveling simultaneously on the conveyor as shown in FIG. 4.

The brush also may be adjusted (not shown) by moving it up and down with relation to the pots in order to adjust the amount of fill each pot will have. Customarily the conveyor will be mounted as indicated by shaft and sprocket arrangements 65 and 67 and will normally have an idle sprocket arrangement 66 to keep sufficient tension.

It will be clear that a drive motor is provided and connected to the elevator mechanism. Such drive motor is shown in phantom and unnumbered at the upper right portion of FIG. 2. Also a drive motor can be utilized for independent driving of the shaft 67 or it may be connected to the driving arrangement for the brush mechanism. It is immaterial whether other various mechanisms are driven by one motor or a series of motors as this is an optional feature. For this reason details of motors have not been shown but it is recognized by those skilled in the art how motors are utilized to drive shafts by sprockets and chains or by belts and the like as well as by direct connection.

While the embodiment of this invention shown and described is fully capable of achieving the objects and advantages desired, many modifications will occur to those skilled in the art without departing from the inventive concepts disclosed. It is not my intention to be restricted to the specific embodiment shown which is for illustrative purposes only.

I claim:

1. A machine for filling material into containers comprising a bin having a hopper for feeding said bin; an elevator which carries material to be filled into said containers from said bin to an elevated position; a chute adjacent the upper portion of said elevator through which said elevator drops said material; means to hold said containers being filled so that they may be passed under said chute; an adjustable baffle plate to divide the flow of the material from said elevated position so that said material may enter more than one of said containers simultaneously in varying amounts; and means beneath the means to hold said containers cooperating therewith to receive and return excess material to said bin.

2. The device of claim 1 in which brush means are incorporated cooperatively with said chute to brush excess material from the top of the containers being filled so as to cause it to enter the means to receive and return excess material.

3. The device of claim 2 in which there are agitators at the junctions of the hopper with the bin.

4. A device for filling flower pot planting material into flower pots comprising hopper means adapted to hold a quantity of the material to be filled into said pots; elevator means cooperating with said hopper means to elevate said material to an elevated position; chute means having adjustable baffle means suitable to divert the material from said elevator into a multiplicity of said pots simultaneously and in different amounts; means holding said pot in such manner as to allow excess material from said filling operation to be returned to said hopper; means to remove excess material from said pots; and agitator means located within said hopper to insure movement of said material to said elevator and chute.